United States Patent [19]
Leir et al.

[11] Patent Number: 5,214,119
[45] Date of Patent: May 25, 1993

[54] BLOCK COPOLYMER, METHOD OF MAKING THE SAME, DIMAINE PRECURSORS OF THE SAME, METHOD OF MAKING SUCH DIAMINES AND END PRODUCTS COMPRISING THE BLOCK COPOLYMER

[75] Inventors: Charles M. Leir, New Richmond, Wis.; Leonard A. Tushaus, Hasting, Minn.; Jerome J. Hoffman, White Bear, Minn.; Gary Wiederholt, West St. Paul, Minn.

[73] Assignee: Minnesota Mining and Manufacturing Company, St. Paul, Minn.

[21] Appl. No.: 616,753

[22] Filed: Nov. 16, 1990

Related U.S. Application Data

[63] Continuation of Ser. No. 273,977, Nov. 21, 1988, abandoned, which is a continuation-in-part of Ser. No. 57,570, Jun. 15, 1987, abandoned, which is a continuation-in-part of Ser. No. 876,918, Jun. 20, 1986, abandoned.

[51] Int. Cl.$^5$ .......................................... C08L 77/458
[52] U.S. Cl. ........................................ 528/28; 528/14; 528/22; 528/37; 528/38; 528/29
[58] Field of Search ...................... 524/14, 22, 28, 37, 524/38

[56] References Cited

U.S. PATENT DOCUMENTS

| | | | |
|---|---|---|---|
| 3,562,352 | 2/1971 | Nyilas | 260/824 |
| 4,518,758 | 5/1985 | Cavezzan et al. | 528/12 |
| 4,528,343 | 7/1985 | Kira | 528/26 |

FOREIGN PATENT DOCUMENTS

| | | |
|---|---|---|
| A20250248 | 12/1987 | European Pat. Off. |
| A13621040 | 1/1984 | Fed. Rep. of Germany |
| 1481512 | 12/1966 | France |
| 1-126389 | 5/1989 | Japan |
| 2140444B | of 0000 | United Kingdom |

OTHER PUBLICATIONS

Abstract No. 89-188438, Release agent for adhesive tape, etc. comprises resin having siloxane] segments, other release materials and solvents.
*Polymer*, vol. 25, pp. 1800–1816, Dec., 1984.

*Primary Examiner*—Ralph H. Dean, Jr.
*Attorney, Agent, or Firm*—Gary L. Griswold; Walter N. Kirn; Janice L. Dowdall

[57] ABSTRACT

Block copolymers having a repeating unit comprised of polysiloxane and urea segments are prepared by copolymerizing certain diaminopolysiloxanes with diisocyanates. The invention also provides novel diaminopolysiloxanes useful as precursors in the preparation of the block copolymers and a method of making such diaminopolysiloxanes. Pressure sensitive adhesive compositions comprising the block copolymer are also provided as are sheet materials coated with the same.

8 Claims, No Drawings

BLOCK COPOLYMER, METHOD OF MAKING THE SAME, DIMAINE PRECURSORS OF THE SAME, METHOD OF MAKING SUCH DIAMINES AND END PRODUCTS COMPRISING THE BLOCK COPOLYMER

This is a continuation of application Ser. No. 07/273,977 filed Nov. 21, 1988, now abandoned, which is a continuation-in-part of U.S. Ser. No. 057,570, filed Jun. 15, 1987, a continuation-in-part of U.S. Ser. No. 876,918, filed Jun. 20, 1986, now abandoned.

FIELD OF THE INVENTION

The present invention relates to organopolysiloxane-polyurea block copolymers, a method of making the same and certain novel diaminopolysiloxanes useful as precursors for making the block copolymers. The invention also relates to a method of making the novel diaminopolysiloxanes. In a further aspect, the invention relates to products which employ the block copolymer such as pressure-sensitive adhesive compositions.

BACKGROUND OF THE INVENTION

Block copolymers have long been used to obtain desirable performance characteristics in various products such as films, adhesives and molded articles. Block copolymers are particularly useful because the blocks can be chemically tailored to optimize desired characteristics.

Siloxane polymers have unique properties derived mainly from the physical and chemical characteristics of the siloxane bond. Such properties include low glass transition temperatures, high thermal and oxidative stability, UV resistance, low surface energy and hydrophobicity, good electrical properties and high permeability to many gases. They also have very good biocompatibility and are of great interest as biomaterials which can be utilized in the body in the presence of blood.

Unfortunately, despite these desirable features, most polydimethylsiloxane polymers based solely on polydimethylsiloxane lack tensile strength. Consequently, several references suggest ways for conveniently increasing the strength of siloxane polymers especially elastomers. For example, various references suggest that mechanical properties of polysiloxane polymers can be improved substantially through the preparation of block copolymers which include as a repeating unit a "soft" polysiloxane block or segment and any of a variety of other "hard" blocks or segments such as polyurethane. See, for example, (Ward) U.K. Pat. No. GB 2 140 444B, published Jun. 5, 1985, (Cavezzan et al) U.S. Pat. No. 4,518,758, (Nyilas) U.S. Pat. No. 3,562,352, and (Kira) U.S. Pat. No. 4,528,343.

Segmented polydimethylsiloxane polyurea elastomers, with silicone segment molecular weights less than about 4,000, prepared from silicone diamines and diisocyanates are described in *Polymer,* Vol. 25, pages 1800–1816, December, 1984.

However, elastomers with silicone segment molecular weights greater than about 4,000 have not been described in the literature. This reflects the difficulty of obtaining silicone diamines of sufficient purity having molecular weights greater than about 4,000. Inherent in the conventional method of preparation of silicone diamines is the generation of monofunctional and nonfunctional impurities in the desired diamine product. These contaminants have the same average molecular weight as the diamine but cannot be removed from the diamine. Thus, elastomers obtained by chain extension of these silicones contain these impurities, and the elastomeric properties are negatively affected by them. For example, monofunctional impurities inhibit the chain extension reaction and limit the attainment of optimum molecular weight, and thereby optimum tensile strength, of the polyurea. Nonfunctional silicone oil can act as a plasticizing agent, which also contributes to reduction in tensile strength, and such oil can bloom to the surface of the elastomer and be transferred, e.g., to a pressure sensitive adhesive in contact with it, resulting in loss of adhesive properties.

SUMMARY OF THE INVENTION

The present invention provides organopolysiloxane-polyurea block copolymers having the conventional excellent physical properties associated with polysiloxanes of low glass transition temperature, high thermal and oxidative stability, UV resistance, low surface energy and hydrophobicity, good electrical properties and high permeability to many gases, and the additional desirable property of having excellent mechanical and elastomeric properties. The organopolysiloxane-polyurea block copolymers of the present invention are thought to have good biocompatibility and are capable of being utilized in situations where conventional polysiloxane polymeric materials have found use. The organopolysiloxane-polyurea block copolymers of the present invention are particularly useful, when tackified with a compatible tackifier resin, as pressure sensitive adhesive compositions.

The organosiloxane-polyurethane block copolymers of the present invention are segmented copolymers of the $(AB)_n$ type which are obtained through a condensation polymerization of a difunctional organopolysiloxane amine (which produces soft segment) with a diisocyanate (which produces a hard segment) and may include a difunctional chain extender such as a difunctional amine or alcohol, or a mixture thereof.

More specifically, the present invention provides organopolysiloxane-polyurea block copolymers comprising a repeating unit represented by Formula I, as follows Organopolysiloxane-polyurea block copolymer comprising the following repeating unit:

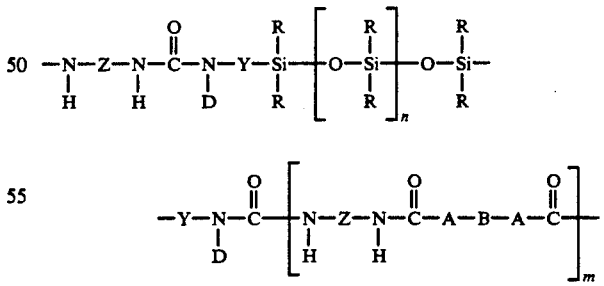

where:
Z is a divalent radical selected from the group consisting of phenylene, alkylene, aralkylene and cycloalkylene;
Y is an alkylene radical of 1 to 10 carbon atoms;
R is at least 50% methyl with the balance of the 100% of all R radicals being selected from the group consisting of a monovalent alkyl radical having from 2 to 12 carbon atoms, a substituted alkyl radical having from 2 to 12 carbon atoms, a vinyl radical, a phenyl radical, and a substituted phenyl radical;

D is selected from the group consisting of hydrogen, and an alkyl radical of 1 to 10 carbon atoms;

B is selected from the group consisting of alkylene, aralkylene, cycloalkylene, phenylene, polyethylene oxide, polypropylene oxide, polytetramethylene oxide, polyethylene adipate, polycaprolactone, polyadiene, and mixtures thereof, and a radical completing a ring structure including A to form a heterocycle;

A is selected from the group consisting of

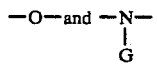

where G is selected from the group consisting of hydrogen, an alkyl radical of 1 to 10 carbon atoms, phenyl, and a radical which completes a ring structure including B to form a heterocycle;

n is a number which is 70 or larger, and m is a number which can be zero to about 25.

In the preferred block copolymer Z is selected from the group consisting of hexamethylene, methylene bis-(phenylene), isophorone, tetramethylene, cyclohexylene, and methylene dicyclohexylene and R is methyl.

A method of making the organopolysiloxane-polyurea block copolymer is also provided. The method comprises polymerizing under reactive conditions and in an inert atmosphere:

(1) a diamine having a molecular weight of at least 5,000 and a molecular structure represented by Formula II, as follows:

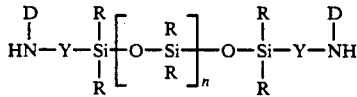

where R, Y, D and n are as defined in Formula I above;

(2) at least one diisocyanate having a molecular structure represented by Formula III, as follows:

OCN—Z—NCO      III where Z is as defined in Formula I above; and (3) up to 95 weight percent diamine or dihydroxy chain extender having a molecular structure represented by Formula IV, as follows:

H—A—B—A—H      IV where A and B are defined above.

The combined molar ratio of silicone diamine, diamine and/or dihydroxy chain extender to diisocyanate in the reaction is that suitable for the formation of a block copolymer with desired properties. Preferably the ratio is maintained in the range of about 1:0.95 to 1:1.05.

The diisocyanate useful in the reaction can be a phenylene diisocyanate such as toluene diisocyanate or p-phenylene diisocyanate, hexamethylene diisocyanate, aralkylene diisocyanate such as methylene bis-(phenylisocyanate) or tetramethylxylene diisocyanate, or a cycloalkylene diisocyanate such as isophorone diisocyanate, methylene bis(cyclohexyl) diisocyanate, or cyclohexyl diisocyanate.

The reaction to make the novel block copolymer involves the use of the novel organopolysiloxane diamine represented by Formula II.

A method of making the organopolysiloxane diamine represented by Formula II is also provided. The method involves:

(1) combining under reaction conditions and in an inert atmosphere:
  (a) amine functional endblocker of the molecular structure represented by Formula V, as follows:

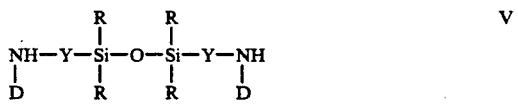

where D and Y are as defined in Formula I, and each R is independently selected from the group consisting of a monovalent alkyl radical having from about 1 to about 12 carbon atoms, a substituted alkyl radical having from about 1 to about 12 carbon atoms, a phenyl radical and a substituted phenyl radical;

(b) sufficient cyclic siloxane to react with said amine functional end blocker to form a lower molecular weight organopolysiloxane diamine having a molecular weight less than about 2,000 and a molecular structure represented by Formula VI, as follows:

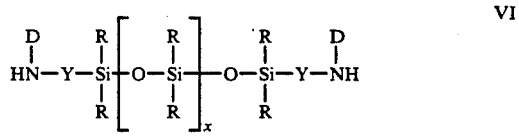

where D, R, and Y are as defined in Formula I, and x is a number in the range of about 4 to 40;

(c) a catalytic amount not to exceed about 0.1% by weight based on the ultimate weight of the final organopolysiloxane diamine of a novel essentially anhydrous amine silanolate catalyst of a molecular structure represented by Formula VII, as follows

where D and Y are as defined in Formula I and each R is independently selected from the group consisting of a monovalent alkyl radical having from about 1 to about 12 carbon atoms, a substituted alkyl radical having from about 2 to about 12 carbon atoms, a phenyl radical and a substituted phenyl radical, and $M^+$ is a cation selected from the group consisting of $K^+$, $Na^+$, or $N(CH_3)_4{}^+$, with $N(CH_3)_4{}^+$ being preferred;

(2) continuing the reaction until substantially, all of the amine functional end blocker is consumed; and (3) adding additional cyclic siloxane until the novel organopolysiloxane diamine represented by Formula II is obtained.

The preferred amine silanolate catalyst is 3-aminopropyl dimethyl tetramethylammonium silanolate. The catalytic amount of the amine silanolate catalyst is preferably less than 0.5 weight percent, most preferably 0.005 to about 0.03 weight percent, based upon the ultimate weight of the final organopolysiloxane.

The preferred reaction conditions comprise a reaction temperature range of about 80° C. to about 90° C., a reaction time of about 5 to 7 hours, and the dropwise addition of the additional cyclic siloxane.

DETAILED DESCRIPTION OF THE INVENTION

The reaction to produce the block copolymer of the invention involves mixing under reactive conditions the organopolysiloxane diamine, diamine and/or dihydroxy chain extender, if used, and diisocyanate to produce the block copolymer with hard and soft segments respectively derived from the diisocyanate and organopolysiloxane diamine. The reaction is typically carried out in a reaction solvent.

Preferred reaction solvents are those which are unreactive with the diisocyanates and which maintain the reactants and products completely in solution throughout the polymerization reaction. It has been found that chlorinated solvents, ethers, and alcohols perform best in the case of aliphatic diisocyanates with methylene chloride, tetrahydrofuran, and isopropyl alcohol being preferred. For aromatic diisocyanates such as 4,4'-methylene-bis-phenyl-isocyanate (MDI), a mixture of tetrahydrofuran with 10% to 25% by weight of dipolar aprotic solvent such as dimethyl-formamide is preferred.

The starting materials and reaction solvents are usually initially purified and dried and the reaction is carried out, under an inert atmosphere such as dry nitrogen or argon.

Suitable diisocyanates include toluene diisocyanate and hexamethylene diisocyanate. Preferred diisocyanates include 4,4'-methylene-bis-phenylisocyanate (MDI), 4,4'-methylene-bis (cyclohexyl)diisocyanate (H-MDI) and isophorone diisocyanate.

Chain extenders may be incorporated with the other reactants to provide other physical properties in the claimed block copolymer. The chain extenders may be short chain diamines such as hexamethylene diamine, xylylene diamine, 1,3-di(4-piperidyl)propane (DIPIP), N(-2-aminoethyl propylmethyldimethoxysilane (DAS), piperazine and the like, with piperidyl propane being preferred.

Polymeric diamines as well as polymeric glycols may also be copolymerized with the polysiloxane diamines, diisocyanates, and other optional non-silicone soft segments as chain extenders to impart additional desirable properties to the silicone polyureas. The resultant copolymeric segments may comprise from as little as 5% to as much as 95% of the copolymer formulation, depending on the properties of the resultant copolymer desired.

Polymeric diamines useful as nonsilicone soft segments are those which can be obtained with functionality approaching 2.0 such as polytetramethylene oxide diamine of from 5,000 to 25,000 molecular weight, with a molecular weight in the range of 8,000 to 15,000 being most preferred. Suitable polymeric diols include polytetramethylene oxide glycol, polyethylene oxide glycol, polyethylene adipate glycol, polypropylene oxide glycol, polybutadiene glycol, polycaprolactone glycol, and the like. In preparing the polyureas from a mixture of polysiloxane and polytetramethylene oxide diamines, the diamines are dissolved together in a suitable solvent such as methylene chloride and the diisocyanate and chain extender, if used, are introduced into the mixture, preferably at a combined amine to diisocyanate molar ratio of 1:0.95 to 1 1.05. A two stage procedure is required to copolymerize the polymeric glycols with silicone diamines in which the glycol is first heated with the diisocyanate in an inert solvent such as toluene or tetrahydrofuran with a catalytic amount of a tin compound such as stannous octoate or dibutyl tin dilaurate for a sufficient amount of time, e.g., one half to one hour, until all of the alcohol groups have been capped with isocyanate. In the second stage, the polysiloxane diamine is added followed by any optional diamine chain extenders to provide the polyether or polyester polyurethane polysiloxane polyurea block copolymer, with the combined molar ratio of amine plus alcohol to isocyanate preferably being held in the range of 1:0.95 to 1:1.05 to provide for complete reaction.

The organopolysiloxane-polyurea block copolymers of this invention, useful as films or coatings, are prepared in and cast from solvents.

A significant feature of the invention is the discovery that substantially pure organopolysiloxane diamines can be produced with a preselected desired molecular weight in excess of 5,000 with excellent difunctionality. It is thought such organopolysiloxane diamines are produced according to the present invention with such high purity because of the presence of the following key process conditions during the preparation:

1. utilize an anhydrous amino alkyl functional silanolate catalyst such as tetramethylammonium 3-aminopropyldimethyl silanolate;
2. use a minimum amount of this catalyst, preferably less than 0.05% by weight based upon the weight of the silicone diamine being prepared; and
3. run the reaction in two stages, as herein described.

As previously mentioned, the reaction to produce the organopolysiloxane diamine employs an anhydrous amine functional silanolate catalyst represented by Formula VII. The preferred catalyst in this polymerization is 3-amino-propyl dimethyl tetramethylammonium silanolate, itself a novel compound, obtained as a crystalline solid from the reaction of one molar equivalent of 1,3 bis-(3-aminopropyl) tetramethyldisiloxane with 2 molar equivalents of tetramethylammonium hydroxide pentahydrate in tetrahydrofuran under reflux, followed by drying under vacuum for 5 hours (0.1 mm) at 60° C.

In the first stage of the reaction, a low molecular weight silicone diamine having a structure as defined by Formula VI is prepared by reacting an amine functional disiloxane endblocker of the type represented by Formula V with a cyclic siloxane in the presence of a catalytic amount of anhydrous amine functional silanolate represented by Formula VII in an inert atmosphere such as nitrogen or argon. The amount of catalyst employed should be less than 0.05 weight percent, preferably 0.005 to about 0.03 weight percent, by weight of the resultant diamino silicone. While not wanting to be bound by theory, it is thought that, by using a minimum amount of an anhydrous amine functional silanolate catalyst, the number of inactive chain ends that are produced by catalyst molecules and spurious water are held to a minimum.

The reaction is typically carried out in bulk at a temperature of 80°-90° C., and under these conditions is usually complete in about 0.5-2 hours, as judged by substantially complete disappearance of the endblocker of the reaction mixture as determined by vapor phase chromatography. An intermediate organopolysiloxane diamine is obtained having a molecular weight of less than about 2,000 and a molecular structure represented by Formula VI.

The second stage of the reaction involves the slow addition of the remainder of the cyclic siloxane required to achieve the desired molecular weight, preferably dropwise addition, at such a rate that the cyclic siloxane is incorporated into the polymer about as fast as it is added, usually in about 5 to 7 hours at the reaction temperature of 80°-90° C. The desired organopolysiloxane diamine is produced having a molecular weight in excess of 5,000 and a structure as defined by Formula II. By utilizing this two-stage method with a minimum amount of amine functional anhydrous silanolate catalyst, silicone diamines of Formula II may be consistently prepared in any desired molecular weight from about 5,000 to about 70,000 having excellent difunctionality with little contamination from monofunctional and nonfunctional polysiloxane impurities.

The prior art method for the preparation of amine terminated silicones from the equilibration of cyclic siloxanes, amine functional disiloxanes and basic catalysts such as tetramethyl ammonium hydroxide or siloxanolate has proven unsatisfactory for obtaining diamino organopolysiloxanes of molecular weight in excess of 4,000 with good difunctionality. These poor results are thought to be caused by a number of deleterious factors inherent in the previous methods, which include running the reaction in a single stage or all at once with the catalyst, amine functional endblocker and all the cyclic siloxane together. This results in incomplete incorporation of endblocker and higher than calculated molecular weights. The use of an excessive amount of a nonfunctional hydrated catalyst produces a significant percentage of non-amine terminated silicone polymers as impurities in the final product. These results are obviated in the method of the present invention by the use of an essentially anhydrous amine functional catalyst at a minimum concentration in a two-stage reaction as described above.

The segmented polysiloxane block copolymers of this invention can be prepared in a wide range of useful properties through variations in the ratio of soft segments to hard segment, the nature of the chain extenders and other polymers employed, and the molecular weight of the polysiloxane segment. For example, the combination of [relatively low molecular weight (4,000-7,000), silicone segments with relatively high hard segment content provides stiff, hard, yet flexible rubbers It has been discovered that these copolymers are suitable for use as release coatings for a variety of pressure-sensitive adhesives. They have a high degree of difunctionality with little contamination from monofunctional or nonfunctional siloxane impurities, virtually eliminating re-adhesion problems They have good stability in solution, are film-forming, and have unusually high strength plus desirable mechanical and elastomeric properties. In addition, they do not require high temperature curing or long processing times, a decided advantage in pressure-sensitive tape manufacturing.

The block copolymers of this invention, for most applications, do not require curing to achieve their desirable properties, but yield tough films upon drying.

Where additional stability, solvent resistance or other additional strength is desired, the silicone block copolymers can be crosslinked after casting or coating by any of the conventional methods described in the art, such as electron beam radiation, or use of peroxides.

As mentioned previously, the segmented copolymers of this invention may be prepared with a wide range of useful properties through variations in the ratio of soft segments to hard segments, the amount and nature of the chain extenders employed, and the molecular weight of the polysiloxane segment These variations give rise to varying amounts of release, i.e., from 10 g/cm or less, to about 350 g/cm. Certain copolymers are especially useful as low-adhesion backsizes (LABs) for removable pressure-sensitive adhesives such as masking tapes. LABs for tapes in roll form ideally exhibit release toward the adhesive of about 60 to 350 g/cm width. The preferred hard segment content for copolymers used as release agents and LABs is from about 15% to about 70%. Preferred ranges vary, depending on the type of adhesive and its ultimate use, i.e., the preferred range for LABs used in masking tapes is from about 25% to about 60%. Copolymers having this range exhibit the necessary combination of adequate unwind on fresh tape and moderate unwind after adverse aging conditions of heat and humidity, plus acceptable paint masking performance, paint flaking resistance and the ability to hold when used in overtaping applications.

Block copolymers of medium molecular weight silicone segments (7,000-25,000) alone, or combined with other elastomeric blocks and a hard segment content in the 15-25% range, provide highly elastic, resilient, quite strong silicone elastomers. With the high difunctionality of the silicone diamines of this invention, it is possible to prepare silicone elastomers even with very high molecular weight silicone segments (25,000-70,000) and hard segment content as low as 0.5 to 10%. Such polymers are extremely soft and deformable and naturally of low tensile strength; however, it has been discovered that when these silicone polyureas are blended with an approximately equal weight of hydroxy-functional silicone tackifier resins commercially available as the MQ series, such as "MQ" SR-545 from the General Electric Company, a new type of silicone pressure-sensitive adhesive is obtained. Through variation in silicone molecular weight and hard segment content, pressure-sensitive adhesive can be formulated with an optimum balance of tack, peel adhesion, and shear holding properties without the necessity of post-curing reactions. Furthermore, since the cohesive strength of these polymers is a result of physical forces of attraction between urea groups and not chemical cross-linking, these silicone polyurea pressure-sensitive adhesives can be coated onto tapes by hot melt extrusion processes.

This invention is further illustrated by the following examples which are not intended to be limiting in scope.

EXAMPLE 1

Preparation of the Catalyst

A 100 ml three-necked round bottom flask equipped with magnetic stirrer, argon inlet and condenser fitted with a drying tube was charged with 12.4 g (0.05 mole) of 1,3-bis (3-aminopropyl) tetramethyldisiloxane, 18.1 g tetramethylammonium hydroxide pentahydrate and 30 ml of tetrahydrofuran. The mixture was stirred and heated under reflux in an argon atmosphere for 1½ hours until a vapor phase chromatograph (VPC) showed complete disappearance of the disiloxane peak. Upon cooling, the mixture separated into two layers. The tetrahydrofuran was allowed to distill from the mixture until a pot temperature of 75° C. was achieved, leaving a yellow oil which was stirred and heated under vacuum (0.1 mm) in an oil bath at 60° C. until no more volatiles distilled (ca 5 hours). The crude product, a yellow waxy solid, was recrystallized from tetrahydrofuran (THF) under argon, filtered and dried under vacuum to give 3-aminopropyl dimethyl tetramethylammonium silanolate as a white crystalline solid. The chemical structure was confirmed by nuclear magnetic resonance analysis (NMR), and the product was stored at room temperature under argon.

EXAMPLE 2

Preparation of Silicone Diamine

A 500 ml three-necked round bottom flask equipped with thermometer, mechanical stirrer, dropping funnel and dry argon inlet was charged with 3.72 g bis (3-aminopropyl) tetramethyldisiloxane and 18 g of octamethylcyclotetra-siloxane ($D_4$) which had been previously purged for 10 minutes with argon. The flask contents were heated to 80° C. with an oil bath and a trace (about 0.03 to 0.05 g) of the catalyst described in Example 1 was added via a spatula. The reaction was stirred at 80° C. and after 30 minutes of stirring had become quite viscous. VPC showed that the endblocker had completely disappeared. To the resultant reaction mixture (which consisted of a 1,500 molecular weight silicone diamine, cyclic siloxanes and active catalyst) was added dropwise over a six hour period 330 g of argon-purged $D_4$, resulting in a further rise in the viscosity. Heating the reaction flask contents at 80° C. was continued overnight. The catalyst was decomposed by heating at 150° C. for ½ hour and the product was stripped at 140° at 0.1 mm pressure until no more volatiles distilled (ca. 1½ hr.), resulting in 310 g of a clear, colorless viscous oil (a yield of 88% of theoretical). The molecular weight of the product determined by acid titration was 21,200.

Using this procedure, but varying the ratio of endblocker to $D_4$, silicone diamines with molecular weights from 4,000 to as high as 70,000 were prepared.

EXAMPLE 3

Preparation of Silicone Polyurea

Under argon, to a solution of 10.92 g of the 21,200 MW silicone diamine described in Example 2 in 65 ml of methylene chloride was added, all at once, a solution of 0.80 g of isophorone diisocyanate (IPDI) in 15 ml of $CH_2Cl_2$, resulting in a clear solution. To the clear solution was added dropwise a solution of 0.65 g 1,3-dipiperidyl propane (DIPIP) in 10 ml $CH_2Cl_2$. Toward the end of the addition, the viscosity rose substantially until the magnetic stirrer almost stopped, producing a clear solution of silicone polyurea with a molar ratio of silicone diamine/DIPIP/IPDI of 1:6:7. This solution was cast onto a glass plate and the solvent allowed to evaporate overnight, resulting in a clear film which was quite strong and highly elastic, and had a tensile strength of 5,210 kPa, 300% elongation, and a permanent set of 5%.

The tensile strength, elongation and permanent set values were all measured at break. The tensile strength, percent elongation, and percent permanent set of the elastomeric materials were determined according to ASTM D 412—68 under ambient conditions at a temperature of about 23° C. According to this procedure, elastomer specimens, cast from solvent, were dried, cut to form "dumbbell"—shaped configurations, and the dumbells were stretched to the breaking point. The stretching was accomplished by use of a tensile testing device which recorded the tensile strength during stretching until the test specimen broke. The tensile strength at break in kPa was recorded. The device also recorded the percent elongation at break to the nearest 10 percent. The percent permanent set was determined by carefully fitting together the broken pieces of the test dumbell 10 minutes after the specimen had broken, measuring the combined length of the broken and stretched specimen pieces, dividing this measured length by the original length of the specimen before stretching, and multiplying the quotient by 100.

EXAMPLES 4–15

Preparation of Silicone Polyurea

Under argon, to a solution of 2.06 g isophorone diisocyanate (IDPI) in 30 ml $CH_2Cl_2$ was added a solution of 0.87 g 1,3-dipiperidyl propane (DIPIP) in 20 ml $CH_2Cl_2$. A solution of 9.8 g of silicone diamine of 9,584 molecular weight in 20 ml $CH_2Cl_2$ was then added dropwise. To the resulting clear solution was added dropwise a solution of 0.86 g of DIPIP in 10 ml of $CH_2Cl_2$. Toward the end of the addition, the reaction mixture became very viscous. After ½ hour, the resultant viscous solution was cast onto a glass plate and the solvent allowed to evaporate, producing an elastomer film of silicone polyurea with a diamine/DIPIP/IPDI molar ratio of 1:8:9, which was clear, yet stiff with a tensile strength of 8,453 kPa, 200% elongation and 15% permanent set.

Silicone polyureas with a wide range of elastomeric properties were prepared by procedures illustrated in the examples above. The properties of a number of these silicone elastomers are listed in Table I below as Examples 5–15.

TABLE I

| | | | Silicone Polyurea Elastomers | | | | |
|---|---|---|---|---|---|---|---|
| | Silicone | Chain | | | Silicone-Polyurea | | |
| Ex. No. | Diamine (MW) | Extender (Moles) | Diisocyanate (Moles) | Inherent Viscosity | Tensile (kPa) | Elongation at Break (%) | Perm. Set (%) |
| 5 | 5,800 | DIPIP (1) | H-MDI (2) | 1.34 | 8,280 | 600 | — |
| 6 | 6,100 | (0) | H-MDI (1) | 0.75 | 4,623 | 750 | 15 |
| 7 | 6,100 | DIPIP (1) | H-mDI (2) | 0.87 | 6,038 | 470 | 25 |
| 8 | 8,400 | DIPIP (5) | H-MDI (6) | 0.75 | 7,590 | 150 | — |
| 9 | 8,400 | DIPIP (8) | IPDI (9) | — | 11,247 | 260 | — |
| 10 | 9,600 | DIPIP (3) | H-MDI (4) | 0.94 | 7,038 | 375 | 15 |
| 11 | 9,600 | DIPIP (8) | H-MDI (9) | — | 8,453 | 200 | 15 |
| 12 | 11,300 | DIPIP (3) | H-MDI (4) | 1.33 | 8,383 | 500 | 6 |
| 13 | 21,200 | DIPIP (6) | IPDI (7) | 1.07 | 5,210 | 300 | 5 |

TABLE I-continued

Silicone Polyurea Elastomers

| Ex. No. | Silicone Diamine (MW) | Chain Extender (Moles) | Diisocyanate (Moles) | Inherent Viscosity | Silicone-Polyurea Tensile (kPa) | Elongation at Break (%) | Perm. Set (%) |
|---|---|---|---|---|---|---|---|
| 14 | 21,200 | DIPIP (6) | H-MDI (7) | 1.15 | 4,382 | 375 | 10 |
| 15 | 36,300 | DIPIP (9) | H-MDI (10) | 1.21 | 3,002 | 520 | 10 |

Chain Extender
DIPIP = 1,3-di (4-piperidyl) propane
Diisocyanates
H-MDI = Methylene 4,4' dicyclohexane isocyanate (hydrogenated - MDI)
IPDI = Isophorone diisocyanate

EXAMPLE 16

Preparation of Silicone Diamine by the Prior Art Procedure

To 10 g of octamethylcyclotetrasiloxane (D$_4$), previously purged for 20 minutes with argon, was added 0.08 g of tetramethyl ammonium hydroxide pentahydrate. After stirring at 80° C. under argon for 30 minutes, the mixture became very viscous indicating that conversion to tetramethyl ammonium siloxanolate (the actual catalyst) had occurred. A solution of 2.5 g bis (aminopropyl) tetramethyl disiloxane endblocker (0.01 mole) in 105 g of D$_4$ was added all at once to produce a clear solution which was stirred at 80° C. to 85° C. under argon to provide an assumed 85% yield of polymer having a theoretical molecular weight of 10,000.

After heating the clear solution for 24 hours, it was determined by VPC that a substantial amount of endblocker had not been incorporated into the polymer. After 48 hours, although VPC indicated that some unincorporated endblocker was still present, the reaction was terminated by heating to 150° C. for 30 minutes. The resultant clear, colorless oil was stripped under aspirator vacuum at 120° to 130° C. for one hour to remove all volatiles, leaving 103 g (87% yield) of product.

Titration of the product with 0.1N hydrochloric acid revealed an amino content of 0.166 meg/g or a calculated molecular weight of 12,043 assuming the product is completely difunctional.

EXAMPLE 16A

Preparation of Silicone Diamine by the Prior Art Procedure

The siloxanolate catalyst was prepared as described above from 30 g D$_4$ and 0.20 g of Me$_4$NOH·5H$_2$O. To this catalyst was added a solution of 9.92 g (H$_2$NCH$_2$CH$_2$CH$_2$Si)$_2$—O endblocker (0.04 mole) in 200 g D$_4$. The mixture was stirred and heated at 85° C. under argon, and the course of the reaction was followed by VPC. After 18 hrs, no endblocker remained in the mixture, and the reaction was terminated by heating at 150° C. for 30 minutes. Residual cyclics were distilled at 130°–150° C. at 0.1 mm Hg, to provide the product as a clear, colorless oil which was cooled to room temperature. The yield was 198 g (83% yield). Titration of the product with 0.1N HCl gave a molecular weight of 5412. The theoretical molecular weight was 5000.

EXAMPLE 17

Preparation of Silicone Polyurea Elastomer Using Prior Art Silicone Diamine

A 100 ml one-neck round bottom flask was charged with 10.51 of the 12,043 molecular weight silicone diamine of Example 16 and dissolved in 50 ml of CH$_2$Cl$_2$. A solution of 0.91 H-MDI in 10 ml CH$_2$Cl$_2$ was added all at once with stirring. The resulting clear solution was treated dropwise with stirring with a solution of 0.55 g 1,3 -bis(4-piperidyl) propane (DIPIP) in 5 ml of CH$_2$Cl$_2$. Toward the end of the addition, the solution became viscous but remained clear. After ½ hour, the viscous solution was cast on a glass plate, leaving an elastomeric film, upon solvent evaporation, of a polyurea with a silicone diamine/DIPIP/H-MDI molar ratio of 1:3:4.

EXAMPLE 17A

Preparation of Silicone Polyurea Elastomer Using Prior Art Silicone Diamine

Following the procedure described in Example 17 above, a silicone polyurea elastomer was prepared from 16.03 g of the 5412 molecular weight silicone diamine of Example 16A, 0.62 g DIPIP, and 1.55 g H-MDI in CH$_2$Cl$_2$ solution. After casting on a glass plate, a clear silicone polyurea elastomer was obtained having the molar ratio of silicone diamine/DIPIP/H-MDI of 1:1:2.

EXAMPLE 18

Comparison of Elastomeric Properties of Silicone Polyureas Prepared with "Prior Art" Silicone Diamines and Present Invention Diamines The tensile strength, inherent viscosity, elongation at break, and permanent set of the silicone polyureas of Examples 17 and 17A were compared to the properties of analogous silicone polyureas derived from silicone diamines of similar molecular weight prepared by the method of the present invention. Results are shown in Table II. Included in this Table II are results obtained from the extraction of these films with boiling cyclohexane (Extractable Oil). Significant amounts of free silicone oil were obtained from films prepared using the "Prior Art" diamines when compared to the films prepared using diamines of the invention. As the molecular weight of the diamine was increased, the relative level of impurities also increased, resulting in progressively inferior physical properties when compared to the polyureas of the present invention.

TABLE II

| Example No. | Molecular Weight of Diamine | Inherent Viscosity | Tensile (kPa) | Elongation at Break (%) | Permanent Set (%) | Extractable Oil (%) |
|---|---|---|---|---|---|---|
| 17A (Prior Art) | 5,400 | .67 | 6916 | 555 | 37 | 3.0 |

TABLE II-continued

| Example No. | Molecular Weight of Diamine | Inherent Viscosity | Tensile (kPa) | Elongation at Break (%) | Permanent Set (%) | Extractable Oil (%) |
| --- | --- | --- | --- | --- | --- | --- |
| Ex. 17 (Prior Art) | 12,000 | .51 | 3312 | 290 | 3 | 6.0 |
| Ex. 3 (The Invention) | 5,300 | .70 | 8034 | 550 | 35 | 1.0 |
| Ex. 12 (The Invention) | 11,300 | 1.33 | 8383 | 500 | 6 | 1.2 |

EXAMPLE 19

A Silicone-Polyether Polyurea Copolymer

A mixture of 8.2 g of a silicone diamine of 8215 molecular weight, 7.3 g of 7,300 molecular weight polytetramethylene oxide diamine, and 0.67 g of DIPIP was dissolved in a solvent system of 90 ml isopropyl alcohol and 50 ml of $CH_2Cl_2$. With stirring at room temperature, 1.11 g of isophorone diisocyanate was added dropwise. Toward the end of the addition, the solution became quite viscous but remained clear and did not gel. A film was cast from the viscous solution, dried and the resulting crystal clear silicone-polyether elastomer had a tensile strength of 19,458 kPa, 650% elongation and 6% permanent set.

EXAMPLE 20

Silicone-Polyester Polyurethane Polyurea Copolymer Elastomers

A one liter, three-necked round bottom flask was charged with 19.2 g of 2000 molecular weight polycaprolactone diol ("Tone"-0240 from Union Carbide) and 100 ml toluene. The solution was heated to boiling and a small quantity of solvent was allowed to distill from the flask to azeotropically dry the contents. Isophorone diisocyanate (9.92 grams) was added, followed by three drops of the catalyst dibutyl tin dilaurate. After an initial vigorous reaction, the clear solution was heated under reflux for ½ hour. The reaction was diluted to 300 ml with toluene and a solution of 24 g of a 10,350 molecular weight silicone diamine in 50 ml of toluene was added fairly rapidly with stirring. The resulting clear, colorless solution was treated rapidly while stirring with a solution of 6.88 g of 1,3-bis (4-piperidyl) propane in 100 ml of isopropyl alcohol. The reaction became quite viscous but remained clear. After an additional hour, the solution was cast in a tray and the solvent allowed to evaporate. The resulting elastomer, a silicone-polyester polyurethane polyurea, contained 40% silicone and was clear, strong and highly elastic.

EXAMPLES 21-24

Preparation of Pressure-Sensitive Adhesive Using Polysiloxane Polyurea Block Copolymer A 200 ml round bottom flask was charged with 23.23 g of freshly prepared silicone diamine of 21,213 molecular weight and 35.3 g of toluene. The solution was stirred at room temperature and 0.29 of H-MDI was added followed by another 28 g toluene. After 20 minutes, the solution had become very viscous. The pressure-sensitive adhesive was produced by adding 39.2 g of a 60% solution in xylene of an MQ silicone resin composition available from General Electric Company as SR-545. The final solids content was adjusted to 35% by the further addition of 10.3 g of toluene. The resulting pressure-sensitive adhesive solution had a silicone polyurea gum to MQ resin weight ratio of 1:1.

By a similar procedure, a number of other silicone polyurea pressure-sensitive adhesives were prepared by blending the polyurea obtained from the reaction of silicone diamines of various molecular weights with equimolar amounts of diisocyanates with an equal weight of MQ silicate resin. These were coated onto polyester film at a 25 to 33 μm thickness to provide pressure-sensitive adhesive flexible sheet materials.

The performance of these examples was evaluated by two standard test methods as described by the American Society of Testing and Materials (ASTM) of Philadelphia, Pennsylvania and the Pressure Sensitive Tape Council (PSTC) of Glenview, Illinois. These are Procedures No. 1 (peel adhesion) and No. 7 (shear strength).

Peel Adhesion

ASTM P3330-78 PSTC-1 (11/75)

Peel adhesion is the force required to remove a coated flexible sheet material from a test panel measured at a specific angle and rate of removal. In the examples this force is expressed in Newtons per 100 mm (N/100 mm) width of coated sheet. The procedure follows:

1. A 12.5 mm width of the coated sheet is applied to the horizontal surface of a clean glass test plate with at least 12.7 lineal cm in firm contact. A hard rubber roller is used to apply the strip.
2. The free end of the coated strip is doubled back nearly touching itself, so the angle of removal will be 180°. The free end is attached to the adhesion tester scale.
3. The glass test plate is clamped in the jaws of the tensile testing machine which is capable of moving the plate away from the scale at a constant rate of 2.3 meters per minute.
4. The scale reading in Newtons is recorded as the tape is peeled from the glass surface. The data is recorded as the average value of the range of numbers observed during the test.

Shear Holding Strength

(Reference: ASTM: D3654-78; PSTC-7)

The shear strength is a measure of the cohesiveness or internal strength of an adhesive. It is based upon the amount of force required to pull an adhesive strip from a standard flat surface in a direction parallel to the surface to which it has been affixed with a definite pressure it is measured in terms of time (in minutes) required to pull a standard area of adhesive coated sheet material from a stainless steel test panel under stress of a constant, standard load.

The tests were conducted on adhesive coated strips applied to a stainless steel panel such that a 12.5 mm portion of each strip was in firm contact with the panel with one end portion of the tape being free. The panel with coated strip attached was held in a rack such that the panel forms an angle of 178° with the extended tape free end which is then tensioned by application of a force of one kilogram applied as a hanging weight from the free end of the coated strip. The 2° less than 180° is used to negate any peel forces thus insuring that only the shear forces are measured in an attempt to more accurately determine the holding power of the tape being tested. The time elapsed for each tape example to separate from the test panel is recorded as the shear strength.

For the examples of pressure-sensitive adhesives prepared from silicone polyureas without chain extenders, the peel adhesion and shear results are listed in Table III.

TABLE III

Silicone Polyurea Pressure-Sensitive Adhesive
[(1:1 Silicone diamine/H-MDI) Gum: MQ resin = 1:1]

| Ex. No. | Silicone Diamine MW | PSA Adhesion N/100 mm | Shear (23° C.) Minutes |
|---|---|---|---|
| 22 | 10.300 | 12 | 10,000+ |
| 21 | 21,200 | 43 | 10,000+ |
| 23 | 36,380 | 61 | 234 |
| 24 | 53,500 | 52 | 382 |

EXAMPLES 25-29

Preparation of Pressure-Sensitive Adhesives Using Polysiloxane Polyurea Block Copolymers With Chain Extenders A solution of 17.55 g of 34,000 molecular weight silicone diamine (0.0585 meq/g) in 100 ml of methylene chloride was rapidly added at room temperature with stirring to a solution of 0.54 g of methylene bis [4,4'dicyclohexyl] isocyanate (H-MDI) in 50 ml of methylene chloride. A solution of 0.12 g of 1,3-bis(4-piperidyl) propane (DIPIP) in 25 ml of methylene chloride was slowly added dropwise resulting in a silicone-polyurea solution which became viscous but did not gel upon completion of the second addition. To prepare the pressure-sensitive adhesive, there was added 30.7 of a 60% xylene solution of MQ silicate resin (SR-545) producing 1:1 silicone block copolymer to tackifier weight ratio. The solution containing this adhesive was cast on polyester to produce a 33 μm adhesive film which was tested according to Pressure Sensitive Tape Council (PSTC) Procedures No. 1 (peel adhesion) and No. 7 (shear strength). The results showed 50N/100 mm of peel adhesion to glass and 10,000 plus minutes of shear holding time. This is compared to a number of other pressure-sensitive adhesive compositions of the invention using silicone diamines having differing molecular weight as shown in Table IV.

TABLE IV

| | Silicone Polyurea Pressure-Sensitive Adhesive (With Chain Extender) | | | | |
|---|---|---|---|---|---|
| | Silicone-Polyurea Gum | | | PSA | |
| Ex. No. | Silicone Diamine (MW) | DIPIP Chain Extender (Moles) | H-MDI (Moles) | Peel Adhesion N/100 mm | Shear Holding 23° C. Minutes |
| 26 | 21,000 | 4 | 5 | 10 | 10,000+ |
| 27 | 21,000 | 3 | 4 | 28 | 10,000+ |
| 28 | 19,000 | 2 | 3 | 31 | — |
| 25 | 34,000 | 3 | 4 | 50 | — |

TABLE IV-continued

| | Silicone Polyurea Pressure-Sensitive Adhesive (With Chain Extender) | | | | |
|---|---|---|---|---|---|
| | Silicone-Polyurea Gum | | | PSA | |
| Ex. No. | Silicone Diamine (MW) | DIPIP Chain Extender (Moles) | H-MDI (Moles) | Peel Adhesion N/100 mm | Shear Holding 23° C. Minutes |
| 29 | 55,000 | 2 | 3 | 76 (split) | — |

EXAMPLE 30

Preparation of Copolymer to be used as Release Agent

| Composition: | |
|---|---|
| PDMS (MW-5560) | 25 parts by weight |
| PCL (MW-1250) | 35 parts by weight |
| DIPIP/IPDI | 40 parts by weight |

Procedure:

Polycaprolactone diol (PCL) (35 g) in toluene was refluxed under nitrogen for 30 minutes with the entire charge of IPDI (24.06 g) in the presence of a catalytic amount (3 drops) of dibutyl tin dilaurate. After reflux, heat was removed and toluene was added to dilute the entire mass to 500 ml. After cooling to room temperature, the PDMS diamine (25.0 g) along with 100 ml toluene was added and stirred for 15 minutes.

Then DIPIP (15.94 g), dissolved in 100 ml isopropanol, was added slowly over a period of 2-3 minutes and stirred for 30 minutes. An increase in viscosity was observed within 5 minutes. The entire solution remained clear and colorless throughout the procedure. A final dilution with toluene brought the solids level to approximately 10% in the solvent blend of 90:10 ratio of toluene:isopropanol. A 1.5 mil urethane saturated smooth crepe paper backing was primed with a chloroprene latex, Neoprene TM (N-115) made by DuPont, in one trip. In a second trip, the LAB was applied from a metering roll to the opposite side of the backing using a 50% solid solution in toluene/isopropanol. Finally, in a third trip, to the primer side was applied a latex adhesive (45% natural rubber/57% Piccolyte TM S-65, a poly β-pinene tackifying resin with a ring and ball softening point of 65° C. made by Hercules Co.), of coating weight of 4.4 mg/cm².

EXAMPLE 31

| Composition: | |
|---|---|
| polydimethyl-diphenyl siloxane (PDMDPS) (MW 2680) | 25% (contains 10 mole % diphenylsiloxane) |
| PCL (MW 1250) | 35% |
| DIPIP/IPDI | 40% |

This was prepared and coated similar to procedure used in Example 30.

EXAMPLE 32

| Composition: | |
|---|---|
| PDMS (MW 5590) | 10% |
| PCL (MW 1240) | 60% |
| DIPIP/IPDI | 15% |

-continued

| Composition: | |
|---|---|
| DAS/IPDI | 15% |

This was coated similar to the procedure used in Example 30.

EXAMPLE 33

| Composition: | |
|---|---|
| PDMS (MW 4900) | 23% |
| PCL (MW 1250) | 42% |
| DIPIP/IPDI | 35% |

This was coated similar to the procedure used in Example 30. The test results from the above examples are tabulated in Table V.

EXAMPLE 34

| Composition: | |
|---|---|
| PDMS (MW 4900) | 20% |
| PCL (MW 1250) | 20% |
| DIPIP/IPDI | 60% |

This was coated similar to the procedure of Example 30.

TESTING

The performance of Examples 30-34 was evaluated by the standard test method for peel adhesion as described supra and the unwind test described below.

UNWIND TEST

Testing was accomplished using an Instron-type testing at 90° angle and 90 in/min separation. Data is presented in ounces per inch.

TABLE V

| | UNWIND | | |
|---|---|---|---|
| EXAMPLE | 3 WEEKS RT | 65° C./16 HRS | 90%-50% RH |
| 30 | 17 | 21 | 21 |
| 31 | 26 | 21 | — |
| 32 | 23 | 12 | 24 |
| 33 | 22 | 12 | 20 |
| 34 | 11 | 17 | n/a |

| | PEEL ADHESION TEST | | |
|---|---|---|---|
| EXAMPLE | 3 WEEKS RT | 65° C./16 HRS | 90%-50% RH |
| 30 | 53 | 52 | 51 |
| 31 | 51 | 51 | — |
| 32 | 50 | 50 | 50 |
| 33 | 51 | 49 | 52 |
| 34 | 50 | 50 | — |

RT = 22° C./50% RH
65° C./16 Hrs. was followed by 24 Hrs. at 22° C./50% RH
90%-50%: Tape was aged at 32° C./90% RH for 2 weeks followed by 1 week at 22° C./50% RH.

All examples were coated from 5% solutions on ULTRA backing using a metering roll.

What is claimed is:

1. Organopolysiloxane polyurea block copolymer comprising the following repeating unit:

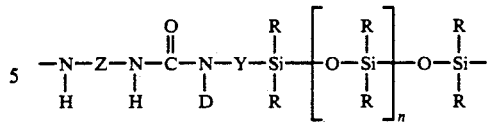

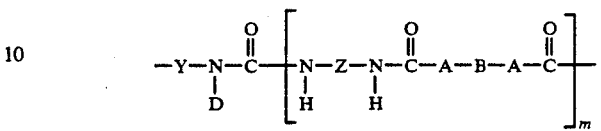

where:
Z is a divalent radical selected from the group consisting of phenylene, alkylene, aralkylene and cycloalkylene;
Y is an alkylene radical of 1 to 10 carbon atoms;
R is at least 50% methyl with the balance of the 100% of all R radicals being selected from the group consisting of a monovalent alkyl radical having from 2 to 12 carbon atoms, substituted alkyl radical having from 2 to 12 carbon atoms, a vinyl radical, a phenyl radical, and a substituted phenyl radical;
D is selected from the group consisting of hydrogen, and an alkyl radical of 1 to 10 carbon atoms and phenyl;
B is selected from the group consisting of alkylene, aralkylene, aralkylene, cycloalkylene, phenylene, polyethylene oxide, polytetramethylene oxide, polycaprolactone, polybutadiene, polypropylene oxide, polyethylene adipate, and mixtures thereof, or it may complete a ring structure including A to form a heterocycle;
A is a difunctional moiety selected from the group consisting of

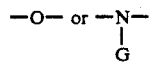

where G is selected from the group consisting of hydrogen, an alkyl radical of 1 to 10 carbon atoms, phenyl, and an alkylene radical which completes a ring structure including B to form a heterocycle;
n is a number which is 70 or larger, and
m is a number which can be zero to about 25, wherein the organopolysiloxane portion of said copolymer is derived from an organopolysiloxane diamine containing less than 1.2% free silicone oil contaminants, said organopolysiloxane diamine having a molecular weight of at least 5000, and being prepared by the steps of
(1) combining under reaction conditions:
(a) amine functional endblocker of the general formula

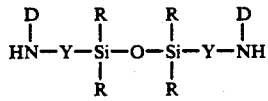

where:
Y and D are as defined above; and each R group is at least 50% methyl with the balance of the 100% of all R radicals being selected from the group consisting of a monovalent alkyl radical having from 2 to 12 carbon atoms, a vinyl radical, a phenyl radical and a substituted phenyl radical (b) sufficient cyclic siloxane to react with said amine functional endblocker to form an intermediate organopolysiloxane diamine having a molecular weight less than about 2,000 and genera formula

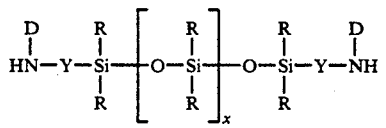

where:

Y and D are as defined above; R is at least 50% methyl with the balance of the 100% of all R radicals being selected from the group consisting of a monovalent alkyl radical having from 2 to 12 carbon atoms, a substituted alkyl radical having from 1 to 12 carbon atoms, a vinyl radical, a phenyl radical and a substituted phenyl radical; and x is a number in the range of about 4 to about 40; and (c) a catalytic amount of a compound characterized by having a molecular structure represented by the formula:

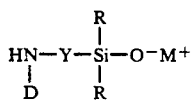

where

Y and D are as defined above; R is each independently selected from the group consisting of a monovalent alkyl radical having from 1 to 12 carbon atoms, a substituted alkyl radical having from 2 to 12 carbon atoms, a phenyl radical, and a substituted phenyl radical; and $M^+$ is selected from the cations $K^+$, $Na^+$ and $N(CH_3)_4^+$;

(2) continuing the reaction until substantially all of said amine functional endblocker is consumed; and (3) adding additional cyclic siloxane until said organopolysiloxane diamine having a molecular weight of at least 5000 is formed.

2. The block copolymer of claim 1 wherein Z is selected from the group consisting of hexamethylene, methylene bis-(phenylene), tetramethylene, isophorone, cyclohexylene, and methylene dicyclohexylene.

3. The block copolymer of claim 1 wherein R is methyl.

4. A method of making organopolysiloxane polyurea block copolymers, said method comprising polymerizing:

(1) an organopolysiloxane diamine having a molecular weight of at least 5,000 and containing less than 1.2% free silicone oil contamination, said diamine having the formula:

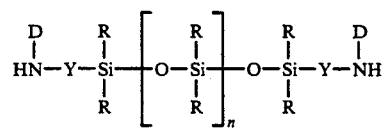

where:

R is at least 50% methyl with the balance of the 100% of all R radicals being selected from the group consisting of a monovalent alkyl radical having 2 to 12 carbon atoms, substituted alkyl radical having 2 to 12 carbon atoms, a vinyl radical, phenyl radical, and substituted phenyl radical group;

Y is an alkylene radical of 1 to 10 carbon atoms;

D is selected from the group consisting of hydrogen, an alkyl radical of 1 to 10 carbon atoms, and phenyl;

n is a number which is 70 or larger; said organopolysiloxane diamine having a molecular weight of at least 5000, and being prepared by the steps of (a) combining under reaction conditions:

(1) amine functional endblocker of the general formula

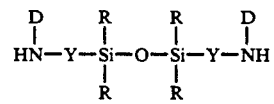

where:

Y and D are as defined above; and all R radicals being selected from the group consisting of a monovalent alkyl radical having from 2 to 12 carbon atoms, a substituted alkyl radical having from 2 to 12 carbon atoms, a vinyl radical, a phenyl radical and a substituted phenyl radical;

(2) sufficient cyclic siloxane to react with said amine functional endblocker to form an intermediate organopolysiloxane diamine having a molecular weight less than about 2,000 and general formula

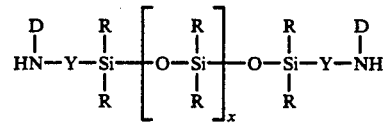

where:

Y and D are as defined above; R is at least 50% methyl with the balance of the 100% of all R radicals being selected from the group consisting of a monovalent alkyl radical having from 2 to 12 carbon atoms, a substituted alkyl radical having from 2 to 12 carbon atoms, a vinyl radical, a phenyl radical and a substituted phenyl radical; and x is a number in the range of about 4 to about 40; and (3) a catalytic amount of a compound characterized by having a molecular structure represented by the formula:

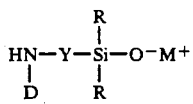

where
Y and D are as defined above; R is each independently selected from the group consisting of a monovalent alkyl radical having from 1 to 12 carbon atoms, a substituted alkyl radical having from 2 to 12 carbon atoms, a phenyl radical, and a substituted phenyl radical; and M+ is selected from the cations K+, Na+ and N(CH$_3$)$_4$+.

(b) continuing the reaction until substantially all of said amine functional endblocker is consumed; and (c) adding additional cyclic siloxane until said organopolysiloxane diamine having a molecular weight of at least 5000 is formed, and (2) at least one diisocyanate having the formula:

OCN—Z—NCO wherein:
Z is a divalent radical selected from the group consisting of phenylene, alkylene, aralkylene and cycloalkyene;
the molar ratio of diamine to diisocyanate being maintained in the range of from about 1:0.95 to 1:1.05; and (3) up to 95 weight percent chain extender selected from the group consisting of diamines, dihydroxy compounds and mixtures thereof.

5. The method of claim 4 wherein said diisocyanate is selected from the group consisting of toluene diisocyanate and p-phenylene diisocyanate.

6. The method of claim 4 wherein said diisocyanate is hexamethylene diisocyanate.

7. The method of claim 4 wherein said diisocyanate is an aralkylene diisocyanate selected from the group consisting of methylene bis-(phenylisocyanate) and tetramethylxylene diisocyanate.

8. The method of claim 4 wherein said diisocyanate is a cycloalkylene diisocyanate selected from the group consisting of isophorone diisocyanate, methylene bis(cyclohexyl) diisocyanate, and cyclohexyl diisocyanate.

* * * * *

UNITED STATES PATENT AND TRADEMARK OFFICE
CERTIFICATE OF CORRECTION

PATENT NO.: 5,214,119

DATED: May 25, 1993

INVENTOR(S): Charles M. Leir et al.

It is certified that error appears in the above-identified patent and that said Letters Patent is hereby corrected as shown below:

Col. 6, line 7, "1 1.05." should be --1:1.05.--

Col. 18, line 27, delete the first occurrence of "and".

Col. 18, line 30, delete the second occurrence of "aralkylene,".

Col. 19, line 2, after "atoms," insert --a substituted alkyl radical having from 2 to 12 carbon atoms,--.

Signed and Sealed this

Second Day of July, 1996

Attest:

BRUCE LEHMAN

Attesting Officer

Commissioner of Patents and Trademarks